United States Patent
Frances et al.

(10) Patent No.: US 9,353,257 B2
(45) Date of Patent: May 31, 2016

(54) CATIONICALLY CROSS-LINKABLE/POLYMERIZABLE ORGANIC RESIN COMPOSITION COMPRISING AN IODONIUM BORATE AND HAVING AN ACCEPTABLE SMELL

(71) Applicant: BLUESTAR SILICONES FRANCE SAS, Lyons (FR)

(72) Inventors: Jean-Marc Frances, Meyzieu (FR); Guillaume Pibre, Saint-Fons (FR)

(73) Assignee: BLUESTAR SILICONES FRANCE SAS, Lyons (FR)

( * ) Notice: Subject to any disclaimer, the term of this patent is extended or adjusted under 35 U.S.C. 154(b) by 0 days.

(21) Appl. No.: 14/433,310

(22) PCT Filed: Oct. 1, 2013

(86) PCT No.: PCT/EP2013/002937
§ 371 (c)(1),
(2) Date: Apr. 2, 2015

(87) PCT Pub. No.: WO2014/053231
PCT Pub. Date: Apr. 10, 2014

(65) Prior Publication Data
US 2015/0240069 A1    Aug. 27, 2015

(51) Int. Cl.
*C08F 2/46* (2006.01)
*C08F 2/50* (2006.01)
*C08G 61/04* (2006.01)
*C08L 63/00* (2006.01)
*C09D 11/102* (2014.01)
*C09D 163/00* (2006.01)

(52) U.S. Cl.
CPC . *C08L 63/00* (2013.01); *C08F 2/50* (2013.01); *C09D 11/102* (2013.01); *C09D 163/00* (2013.01)

(58) Field of Classification Search
CPC ..... C08L 63/00; C09D 11/102; C09D 163/00
USPC ............... 522/31, 6, 1, 71, 189, 184; 520/1
See application file for complete search history.

(56) References Cited

U.S. PATENT DOCUMENTS

| 2005/0165141 | A1  | 7/2005 | Wolf et al. |
| 2011/0118374 | A1* | 5/2011 | Schneider ............... C08F 2/50 522/25 |
| 2015/0232700 | A1* | 8/2015 | Frances ............... C09D 183/06 522/31 |

FOREIGN PATENT DOCUMENTS

| FR | 2925908 A1 | 7/2009 |
| JP | 07-179511 | * 7/1995 |
| JP | 2009-102482 A | 5/2009 |
| WO | 2009/083564 A1 | 7/2009 |

OTHER PUBLICATIONS

Hasegawa et al, 07-179511 Machine translation, Jul. 18, 1995.*
O'Lenick Jr, Anthony et al, Guerbet Alcohols A versatile Hydrophobe, 1987, Soap/comsmtics/chemical specialties, 52, 54-55 and 115.*
English Translation of International Search Report dated Nov. 8, 2013 corresponding to International Patent Application No. PCT/EP2013/002937, 2 pages.

* cited by examiner

*Primary Examiner* — Ling Choi
*Assistant Examiner* — Jessica E Whiteley
(74) *Attorney, Agent, or Firm* — Dentons US LLP

(57) ABSTRACT

A photo-primer composition B is described that includes a specific iodonium salt combined with a hydrogen donor that is a Guerbet alcohol that can also be used as a solvent. The primer system can be used for solving odor problems, particularly after the polymerization/cross-linking of traditional iodonium salts.

33 Claims, No Drawings

CATIONICALLY CROSS-LINKABLE/POLYMERIZABLE ORGANIC RESIN COMPOSITION COMPRISING AN IODONIUM BORATE AND HAVING AN ACCEPTABLE SMELL

CROSS-REFERENCE TO PRIOR APPLICATIONS

This application is a National Stage of PCT/EP2013/002937, filed Oct. 1, 2013, and designating the United States (published on Apr. 10, 2014, as WO 2014/053231 A1), which claims priority under 35 U.S.C. §119 to French Patent Application No. 12/02616, filed Oct. 2, 2012, each hereby expressly incorporated by reference in its entirety and each assigned to the assignee hereof.

The field of the invention is that of compositions used as cationic photoinitiators in compositions based on organic monomers, oligomers and/or polymers capable of being cationically polymerized or crosslinked and comprising reactive functional radicals, so as to obtain a polymerized and/or crosslinked film, coating or bulk material (for example composite).

More specifically, the subject of the present invention is:
- a composition which is polymerizable or crosslinkable cationically, under activation which is thermal or actinic or by an electron beam, comprising a photoinitiator composition according to the invention,
- a process for producing a film or a coating on a substrate or an article using the catatonically polymerizable or crosslinkable composition according to the invention; and
- a substrate or object of which at least one surface is coated with a film or a coating obtained from the cationically polymerizable or crosslinkable composition according to the invention.

The principle of a photoinduced polymerization or photopolymerization reaction consists in exposing a composition comprising monomers, oligomers and/or polymers bearing reactive functionalities (such as acrylic, vinyl, epoxy, etc.) to light radiation so as to produce active species (free radicals or cations) in order to initiate a polymerization. The generation of these species does not take place by direct excitation of the monomer, but by means of one or more additive(s) contained in the photosensitive formulation and more commonly denoted "photoinitiator".

Photoinitiators are categorized in two major families:
- radical photoinitiators, and
- cationic photoinitiators.

Radical photoinitiators are, inter alia, aromatic ketones which, after exposure under ultraviolet (UV) radiation:
- undergo hemolytic scission in the α-position with respect to the carbonyl function (such as for acyl phosphonate derivatives, acyl phosphine oxide derivatives, benzoin ether derivatives and acetophenone derivatives) with formation of two radical fragments, one of which is a benzoyl radical (type I photoinitiators), or
- form free radicals when they are promoted in their excited states by pulling off hydrogen from a hydrogen-donating molecule (more commonly denoted "coinitiator"), which results in the formation of an inactive cetyl radical and of an initiator radical derived from the corresponding donor (type II photoinitiators).

As examples of type I photoinitiators, mention may be made of: α-hydroxy ketones, benzoin ethers, α-aminoaromatic ketones and acylphosphine oxides. As examples of type II photoinitiators, mention may be made of: isopropylthioxanthone (ITX), benzophenone and camphorquinone (CQ). As examples of coinitiators, mention may be made of: phenyltetrazolethiol, tris(trimethylsilyl)silene and aromatic amines such as ethyl dimethylaminobenzoate (EDB).

The activity of type I or II photoinitiators in radical polymerization reactions is strongly inhibited by atmospheric oxygen. Indeed, oxygen is known to have inhibitory properties by energy transfer with respect to the singlet and triplet excited states of these photoinitiators and by conversion of free radicals into peroxyl radicals devoid of initiating activity.

Among cationic photoinitiators, two categories are often distinguished depending on whether they release, after photolysis and in the presence of a hydrogen-donating molecule:
- a Brönsted acid, such as onium salts (diaryliodonium salts, aryldiazonium salts, alkoxypyridinium salts, triarylsulfonium salts and sulfonium salts), or
- a Lewis acid, such as organometallic salts (essentially ferrocenium salts).

During the photolysis of onium salts, the protonic acid generated is capable of initiating the cationic polymerization of monomers which do not polymerize via the radical route, such as vinyl ethers or heterocyclic monomers (epoxides, lactones, cyclic ethers, epoxysilicones). The main characteristic of this type of polymerization is its insensitivity with respect to oxygen, and also its "living" nature. Indeed, the carbocations do not react with one another, such that the polymerization, once initiated, will be able to continue in darkness until complete consumption of the monomer.

For onium salts, it is the cationic part which is responsible for the absorption of the UV radiation, and as regards the anionic part, it determines the strength of the acid formed and, consequently, the rate of initiation of the polymerization. The weaker its nucleophilic nature, the faster the photolysis reaction. The various counterfoils used in the cationic photoinitiators can therefore be categorized according to their (decreasing) reactivity:

According to the applications, it is also possible no combine a photosensitizer with the photoinitiator. A photosensitizer is a molecule which absorbs wavelengths different than those absorbed by the photoinitiator, thus extending their spectral sensitivity. Photosensitization consists of an energy transfer from the photosensitizer in the excited state to the photoinitiator. The photosensitizer increases the fraction of light absorbed by the initiator and therefore the photolysis yield. Thus, a greater amount of reactive species are generated and, consequently, the polymerization is more rapid. As examples of photosensitizers, mention may be made of: anthraquinone, anthracene, pyrene, phenothiazine, benzophenone, acetophenone, xanthones, carbazole derivatives, fluorenone and acylphosphine oxides.

Among the cationic photoinitiators, mention may be made of the iodonium or sulfonium salts described in U.S. Pat. No. 4,256,828. The reference EP-0 562 897 describes polymerization or crosslinking initiators associated with monomers, oligomers or polymers comprising reactive organofunctional groups in their structure. In particular, document EP-0 562 897 describes a composition of which the photoinitiator is in solution at 50% by weight in methanol and has the following structure:

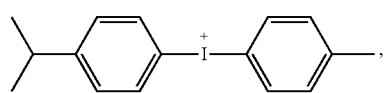

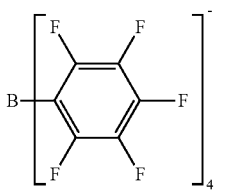

This composition is intended for the production of coatings on a paper substrate using epoxidized monomers that are polymerized and crosslinked by irradiation under UV.

In point of fact, it so happens that photoinitiators of iodonium borate type, while they are particularly effective, have the major drawback of being formulated using alcoholic solutions, usually in a methanol or isopropanol solution, which presents safety problems associated with the flashpoints of these solvents. Furthermore, the presence of a characteristic: odor, perhaps due to decomposition of the photoinitiator after use thereof, results in an unpleasant perception by users. This therefore creates a need to dispense with them, especially in an industrial environment where production rates are increasingly high. The solutions for treating this problem in an industrial environment involve the use of expensive equipment (ventilation, fume cupboard, etc.). Depending on the facilities and rates used, these odors may even be described as "olfactory pollutions" from the moment that they are perceived as an (excessive) nuisance by users.

It should be noted that, in the present disclosure, the term "odor" will be defined according to standard ISO 5492—NF EN 13725, which defines it as an organoleptic attribute perceived by means of the olfactory organ in sniffing certain volatile substances.

More recently, in order to respond to this problem of unpleasant perception of odor in compositions for inks or varnishes that is associated with the use of cat ionic photoinitiators of iodonium salt type, patent, application WO2009083564-(A1) proposes the combination of an iodonium borate-type photoinitiator with a specific category of photosensitizers chosen from diether-anthracenes, diether-naphthalenes and diether-benzenes. However, the major drawback associated with this combination is the reactivity of the system, which is too low for industrial use. Indeed, the time required for gel setting of the mass to be cross linked is between 6 seconds and 120 seconds.

Thus, the industry of varnishes and coatings on a substrate is always seeking a new cationic photoinitiator or a composition that is of use as a cationic photoinitiator:
  making it possible to achieve polymerization/crosslinking reactivities and rates that are as high as possible, in particular so as to be able to maintain industrial coating rates, for example, when it is a question of coatings (inks, varnishes),
  and without however presenting problems linked to the presence of an unpleasant odor according to user perception, thus avoiding the setting up of expensive technical solutions in order to solve this problem of olfactory nuisance.

The perception of odor or mixtures of odors is well known empirically. Nevertheless, theoretical knowledge in this field, although it is constantly progressing, still comes up against the difficulty of predicting, for a chemical compound or a mixture of chemical compounds:
  the actual perception of an odor, or of its "olfactory threshold" which is the minimum concentration producing an odor perceptible by a panel of individuals,
  the determination of the pleasurable nature when an odor is perceived, and
  the intensity of the odor due to this chemical compound or of this mixture of chemical compounds.

In these circumstances, one of the essential objectives of the present invention is to provide a composition which is polymerizable or cross linkable cationically, under activation which is thermal or actinic or by an electron beam, using photoinitiator compositions making it possible to achieve polymerization/cross linking reactivities and rates that are as high as possible, in particular so as to be able to use them in the coating industry, such as in inks or varnishes, and without however presenting the problems linked to the presence of an unpleasant odor according to user perception (in particular after polymerization/crosslinking), thus avoiding the setting up of expensive technical solutions in order to solve this problem of olfactory nuisance.

Another essential objective of the invention is to provide a process for producing a film or a coating on a substrate or an article using the composition according to the invention.

The final object of the invention is to provide a substrate or an object of which at least one surface is coated with a film or a coating obtained from the cationically polymerizable or crosslinkable composition according to the invention.

These various objectives are achieved by the invention which relates first of ail, in its first subject, to a novel composition R which is polymerizable and/or crosslinkable cationically, under activation which is thermal and/or actinic and/or by an electron beam, comprising:
  1) at least one cationically polymerizable and/or crosslinkable organic compound D not containing a silicon atom;
  2) an effective catalytic amount of a cationic photoinitiator composition P comprising:
  a) at least one iodonium salt A of formula (I)' below:

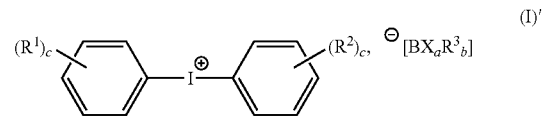

wherein:
  the symbols $R^1$ and $R^2$ are identical or different, and each represent a linear or branched alkyl radical having from 10 to 30 carbon atoms and preferably from 10 to 20 carbon atoms, and even more preferentially from 10 to 15 carbon atoms,
  a and b are integers such that $0 \leq a \leq 3$, $1 \leq b \leq 4$ and $a+b=4$,
  c and c' are integers, which may be identical or different, ranging from 1 to 5 and preferably c and c' are equal to 1,
  the symbols X, which may be identical or different, represent a chlorine or fluorine atom with $0 \leq a \leq 3$, or an OH function with $0 \leq a \leq 2$, and
  the symbols $R^3$, which may be identical or different, represent a phenyl radical substituted with at least 2 halogen atoms, and preferably with at least 2 fluorine atoms, or at least one electron-withdrawing group chosen from the group consisting of: $-CF_3$, $-OCF_3$; $-NO_2$, $-CN$, $-SO_2-C_nF_{2n+}$, $-(CO)-C_nF_{2n+1}$, $-O-C_nF_{2n+1}$ and $-C_nF_{2n+1}$, with n being an integer from 1 to 20, or an aryl radical containing at least two aromatic nuclei, such as biphenyl, naphthyl, optionally substituted with at least one halogen atom, in particular a fluorine atom, or an electron-withdrawing group such as: $-CF_3$, —OCF$_3$, —NO$_2$, —CN, —SO$_2$—C$_n$F$_{2n+}$, —(CO)—C$_n$F$_{2n+1}$, —O—C$_n$F$_{2n+1}$, and —C$_n$F$_{2n+1}$, with n being an integer from 1 to 20,
b) at least one hydrogen donor B chosen from the group consisting of Guerbet alcohols of formula (II) below:

$$R^4—CH(CH_2OH)—R^5 \quad (II)$$

wherein:
the symbols R$^4$ and R$^5$ are identical or different, and each represent an alkyl radical having from 4 to 12 carbon atoms, and
with the additional condition that the total number of carbon atoms of said Guerbet alcohol is from 10 to 20 carbon atoms, and
c) optionally at least one thermal stabilizer C,
3) optionally an effective amount of at least one photosensitizer E,
4) optionally at least one organic solvent F,
5) optionally at least one additive Q, and
6) optionally at least one thermal stabilizer C.

Preferably, the composition R which is polymerizable and/or crosslinkable cationically, under activation which is thermal and/or actinic and/or by an electron beam comprises:
1) at least one cationically polymerizable and/or crosslinkable organic compound D not containing a silicon atom;
2) an effective catalytic amount of a cationic photoinitiator composition P comprising:
a) at least one iodonium salt A of formula (I) below:

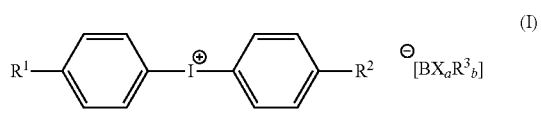

wherein:
the symbols R$^1$ and R$^2$ are identical or different, and each represent a linear or branched alkyl radical having from 10 to 30 carbon atoms and preferably from 10 to 20 carbon atoms, and even more preferentially from 10 to 15 carbon atoms,
a and b are integers such that $0 \leq a \leq 3$, $1 \leq b \leq 4$ and $a+b=4$,
the symbols X, which may be identical or different, represent a chlorine or fluorine atom with $0 \leq a \leq 3$, or an OH function with $0 \leq a \leq 2$, and
the symbols R$^3$, which may be identical or different, represent a phenyl radical substituted with at least 2 halogen atoms, and preferably with at least 2 fluorine atoms, or at least one electron-withdrawing group chosen from the group consisting of: —CF$_3$, —OCF$_3$, —NO$_2$, —CN, —SO$_2$—C$_n$F$_{2n+}$, —(CO)—C$_n$F$_{2n+1}$, —O—C$_n$F$_{2n+1}$, and —C$_n$F$_{2n+1}$, with n being an integer from 1 to 20, or an aryl radical containing at least two aromatic nuclei, such as biphenyl, naphthyl, optionally substituted with at least one halogen atom, in particular a fluorine atom, or an electron-withdrawing group such as: —CF$_3$, —OCF$_3$, —NO$_2$, —CN, —SO$_2$—C$_n$F$_{2n+}$, —(CO)—C$_n$F$_{2n+1}$, —O—C$_n$F$_{2n+1}$ and C$_n$F$_{2n+1}$, with n being an integer from 1 to 20,
b) at least one hydrogen donor B chosen from the group consisting of Guerbet alcohols of formula (II) below:

$$R^4—CH(CH_2OH)—R^5 \quad (II)$$

wherein:
the symbols R$^4$ and R$^5$ are identical or different, and each represent an alkyl radical having from 4 to 12 carbon atoms, and
with the additional condition that the total number of carbon atoms of said Guerbet alcohol is from 10 to 20 carbon atoms, and
c) optionally at least one thermal stabilizer C,
3) optionally an effective amount of at least one photosensitizer E,
4) optionally at least one organic solvent F,
5) optionally at least one additive Q, and
6) optionally at least one thermal stabilizer C.

It is to the credit of the inventors to have selected a combination between a specific photoinitiator which is an iodonium borate having, for its cationic part at the level of its aromatic nuclei, alkyl radical groups having from 10 to 30 carbon atoms, and a hydrogen donor B chosen from a specific category of alcohols which is that of Guerbet alcohols, such that there are no longer any problems linked to the presence of an unpleasant odor perceived by users and thus avoiding the setting up of expensive technical solutions in order to solve this problem of olfactory nuisance.

Another important advantage concerns the better reactivity of this novel photoinitiator composition compared with the prior art photoinitiators, thus making it possible to increase coating rates for example when it is a question of coatings (varnishes).

Furthermore, the use of the composition P as a cationic photoinitiator has the advantage of decreasing the production of volatile organic compounds (VOCs) when it is used as a cationic photoinitiator.

The composition P also has the advantage of eliminating the inflammable risk by conferring on the mixture a high flashpoint, contrary to the iodonium borate photoinitiators of the prior art which are formulated in alcohols such as methanol or isopropanol.

In one preferred embodiment, the Guerbet alcohol according to the invention may also additionally act as a solvent for the iodonium salt A such that the composition P is in the form of a mixture of the iodonium salt A in solution in the hydrogen donor B according to the invention. Those skilled in the art will, be able to adjust the concentration of each of the constituents and the procedure so as to obtain a more or less concentrated iodonium salt solution.

Preferably, the composition P comprises:
a) 1 to 95 parts by weight, preferably from 20 to 80 parts by weight relative to the total weight of the composition P, of the iodonium salt(s) A,
b) 5 to 99 parts by weight, preferably from 20 to 80 parts by weight relative to the total weight of the composition P, of at least one hydrogen donor B which is preferably a Guerbet alcohol, and
c) 0 to 5 parts by weight relative to the total weight of the composition P, of at least one thermal stabilizer C.

Guerbet alcohols are well known and are commercially available. They have the advantage of having low melting points whereas, at equivalent carbon number, their linear homologs are in the solid state.

According to one preferred embodiment, the hydrogen donor B is a Guerbet alcohol which has the formula below:

$$H_{2n-3}C_{n-2}—\overset{\overset{\displaystyle C_nH_{2n+1}}{|}}{CH}—CH_2—OH \quad (III)$$

wherein n is an integer from 5 to 10 (5, 6, 7, 8, 9 or 10) and preferably from 6 to 10.

According to another preferred embodiment of the invention, the hydrogen donor B is chosen from the group consisting of the following Guerbet alcohols: 2-butyl-1-octanol, 2-pentyl-1-nonanol, 2-hexyldecan-1-ol, 2-octyldecan-1-ol and 2-octyldodecan-1-ol, and mixtures thereof.

According to the nomenclature used, mention may be made of the following Guerbet alcohols, some of which may be commercially available, in the form of 2 or more constituents in a mixture:

- 2-butyl-1-octanol, CAS No.: 3913-02-8, also called: 5-(hydroxymethyl)undecane; Guerbet $C_{12}$; Guerbet dodecanol; Isofol® 12 or Jarcol® I-12; available from Sasol Germany,
- 2-pentyl-1-nonanol, CAS No.: 5333-48-2,
- 2-hexyldecan-1-ol, GAS No.: 2425-77-6, Guerbet $C_{16}$; Guerbet hexadecanol; Guerbitol 16; Isofol® 16; or Jarcol® I-16,
- 2-octyldecan-1-ol, or octyldecanol (CAS: 70693-04-8) available from Sasol Germany or which can be found as a mixture under the name Jarcol® I-18T (mixture of $C_{16}$, $C_{18}$ and $C_{20}$ Guerbet alcohols), and
- 2-octyldodecan-1-ol, CAS No.: 5333-42-6, or 2-octyl-1-dodecanol Jarcol® I-20 (the products of the Jarcol® range are sold by the company Jarchem Innovative Ingredients or are available from the following companies: Cognis (BASF) Japan or Kao Corporation Japan.

Preferably, the anion of the iodonium salt A is chosen from the group consisting of the following anions: $[B(C_6F_5)_4]^-$, $[B(C_6H_3(CF_3)_2)_4]^-$, $[B(C_6H_4OCF_3)_4]^-$, $[B(C_6H_4CF_3)_4]^-$, $[(C_6F_5)_2BF_2]^-$, $(C_6F_5BF_3)^-$ and $[B(C_6H_3F_2)_4]^-$ and preferably from the subgroup consisting of the following anions: $B(C_6F_5)_4^-$ and $[B(C_6H_3(CF_3)_2)_4]^-$.

Preferably, for the cationic part of the iodonium salt A, the symbols $R^1$ and $R^2$ are identical or different, and each represent an alkyl radical chosen from the group consisting of the following radicals:

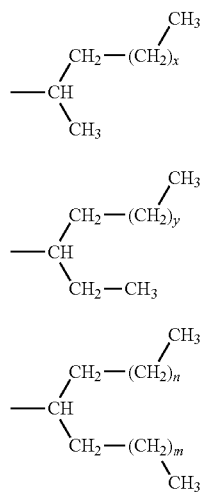

with:
x is an integer ranging from 6 to 16 and preferably from 6 to 11,
y is an integer ranging from 5 to 15 and preferably from 5 to 10, and
n and m are integers which may be identical or different and the sum n+m of which is between 5 and 15 (limits included).

According to the preparation mode used, the iodonium salt A may be in the form of a mixture of salts of similar structures for the anionic part, but of varied structures for the cationic part of alkylphenyliodonium, the alkyl chain of which is linear or branched and composed of 10 to 30 carbon atoms and preferably of 10 to 20 carbon atoms, even more preferentially of 10 to 15 carbon atoms, even more preferentially of 10 to 13 carbon atoms and even more preferentially of 12 carbon atoms.

According to one preferred embodiment, the iodonium salt A has the formula (IV) below:

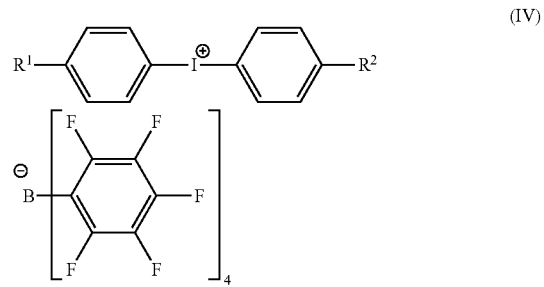

wherein:
the symbols $R^1$ and $R^2$ are identical or different, and each represent a linear or branched alkyl radical having from 10 to 30 carbon atoms and preferably from 10 to 20 carbon atoms and even more preferentially from 10 to 15 carbon atoms.

According to one particularly preferred embodiment, the iodonium salts A are chosen from the following structures:

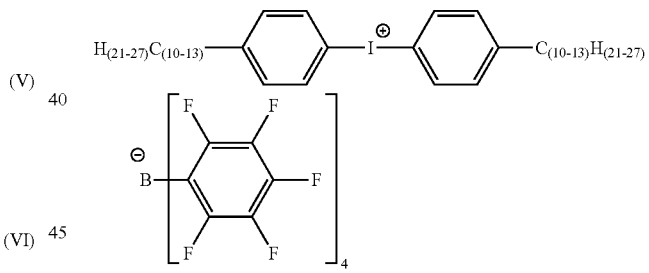

The iodonium salt A which is the subject of the present invention may be prepared by exchange reaction between a salt of the cationic entity (halide, such as, for example, chloride or iodide) and an alkali metal salt of the anionic entity (sodium, lithium or potassium). The operating conditions (respective amounts of the reagents, choice of the solvents, duration, temperature, stirring) are within the scope of those skilled in the art; said conditions must make it possible to recover the desired onium borate in solid form by filtration of the precipitate formed or in oily form by extraction using an appropriate solvent. The procedures for synthesizing the abovementioned cationic entity iodides are known per se. On this subject, see in particular EP-0 562 897. The procedures for synthesizing the alkali metal salts of the borate anionic entity are also known per se; in particular, for example, in patent EP-0 562 897.

Advantageously, the composition P according to the invention may be prepared by means of the process comprising the following steps:

a) precursor salts of formulae (VIII) and (IX) below are prepared:

$$Z^+ \; {}^-[BX_aR^3{}_b] \quad (VIII)$$

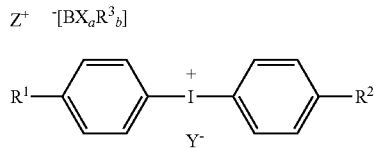

(IX)

in which formulae:
the symbols $R^1$ and $R^2$ are identical or different, and each represent a linear or branched alkyl radical having from 10 to 30 carbon atoms and preferably from 10 to 20 carbon atoms and even more preferentially from 10 to 15 carbon atoms,
a and b are integers such that $0 \leq a \leq 3$, $1 \leq b \leq 4$ and $a+b=4$,
the symbols X, which may be identical or different, represent:
  a chlorine or fluorine atom with $0 \leq a \leq 3$, or
  an OH function with $0 \leq a \leq 2$, and
the symbols $R^3$, which may be identical or different, represent:
a phenyl radical substituted with:
  at least 2 halogen atoms, and preferably with at least 2 fluorine atoms, or
  at least one electron-withdrawing group chosen from the group consisting of: —$CF_3$, —$OCF_3$, —$NO_2$, —CN, —$SO_2$—$C_nF_{2n+}$, —(CO)—$C_nF_{2n+1}$, —O—$C_nF_{2n+1}$ and $C_nF_{2n+1}$, with n being an integer from 1 to 20, or
an aryl radical containing at least two aromatic nuclei, such as biphenyl, naphthyl, optionally substituted with at least one halogen atom, in particular a fluorine atom, or an electron-withdrawing group such as: —$CF_3$, —$OCF_3$, —$NO_2$, —CN, —$SO_2$—$C_nF_{2n+}$, —(CO)—$C_nF_{2n+1}$, —O—$C_nF_{2n+1}$, and $C_nF_{2n+1}$, with n being an integer from 1 to 20,
the symbol $Z^+$ is a cation of an atom or of a group of atoms and preferably the symbol $Z^+$ is $Na^+$, $Li^+$ or $K^+$, and
the symbol $Y^-$ is an anion of an atom or of a group of atoms and preferably $Y^-$ is the bromide ($Br^-$) or iodide ($I^-$) anion,
b) a mixture No. 1 is prepared, consisting of a precursor salt of formula (VIII) and water, and a mixture No. 2 is prepared, consisting of at least one precursor salt of formula (IX) and at least one Guerbet alcohol according to the invention and as described above,
c) mixture No. 1 or mixture No. 2 is placed in a reactor with stirring and optionally under reflux, and the temperature of the reactor is preferably raised and maintained in a range of between 30 and 80° C. and even more preferentially in a range of between 50 and 80° C.,
d) then either mixture No. 1, when, in step c), mixture No. 2 is present in the reactor, or mixture No. 2, when, in step c), mixture No. 1 is present in the reactor, is added with stirring, and the temperature of the reactor is preferably maintained in a range of between 30 and 80° C. and even more preferentially in a range of between 50 and 80° C.,
e) when the reaction has ended, the reactor is optionally cooled and the organic phase is separated from the aqueous phase,
f) optionally, the organic phase is washed with water,
g) optionally, the organic phase is devolatilized, and
h) the organic phase is recovered, which is the composition P to which at least one thermal stabilizer C is optionally added.

As examples of precursor salts (VIII), mention may be made of the following salts:
triphenylmethylium tetrakis(pentafluorophenyl)borate (CAS No.: 136040-19-2), lithium tetrakis(pentafluoro-phenyl)borate (in its form complexed with an ethyl ether ligand, CAS No.: 155543-02-5, sodium tetrakis-(pentafluorophenyl)borate (CAS No.: 149213-65-05 and potassium tetrakis(pentafluorophenyl)borate (CAS No.: 89171-23-3) which are well-known compounds that are commercially available. The preferred precursor salts of formula (VIII) are sodium tetrakis (pentafluorophenyl)borate (CAS No.: 149213-65-0) and potassium tetrakis(pentafluorophenyl)borate (CAS No.: 89171-23-3).

The precursor salts of formula (IX) are well-known compounds that can be prepared according to the protocol described in patent application EP-2428501-A1. These precursor salts of formula (IX) may be in the form of a mixture of two or three compounds or more.

According to one preferred embodiment, in step b) of the process according to the invention, the preparation with stirring of mixture No. 2 consisting of at least one precursor salt of formula (IX) and at least one Guerbet alcohol is carried out in a reactor at a temperature of between 40 and 85° C. and even more preferentially between 50 and 80° C., then, in step c), the temperature is maintained and, in step d), mixture No. 1 is added to mixture No. 2 while maintaining the temperature of the reactor between 40 and 85° C. and even more preferentially between 50 and 80° C.

In one preferred embodiment, the Guerbet alcohol according to the invention may also additionally act as a solvent for the iodonium salt A such that the composition P is in the form of a mixture of the iodonium salt A in solution in the hydrogen donor B according to the invention. Those skilled in the art will be able to adjust the concentration of each of the constituents so as to obtain a more or less concentrated solution of at least one precursor salt of the formula (IX) and of at least one Guerbet alcohol.

One or more thermal stabilizer(s) C may be present in the composition P according to the invention or in a composition to be polymerized and/or to be crosslinked and in which the composition P is present and is used as a cationic photoinitiator. Examples of thermal stabilizers C are described in the article by J. F. Rabek, "Photostabilization of Polymers; Principles and Applications", Elsevier Applied Science, NY, 1990 or in the reference "Plastics Additives Handbook", 5th edition, edited by K. Zweifel, Hanser Publishers, 2001.

According to one preferred embodiment of the invention, the thermal stabilizer C is chosen from, the group consisting of; an amine, a compound of which the chemical structure comprises a sterically hindered group and a nitroxyl function, a compound of which the chemical structure comprises a sterically hindered, group and a phenol function, an organophosphorus compound, and combinations thereof.

As more specific examples, mention may be made of:
organic phosphites and phosphonites, such as the following compounds: triphenyl phosphite, diphenylalkyl phosphites, phenyldialkyl phosphites, tri(nonylphenyl) phosphite, trilauryl phosphite, trioctadecyl phosphite, distearyl pentaerythritol diphosphite, tris(2,4-di-tert-butylphenyl)phosphite, diisodecylpentaerythritol diphosphite, di(2,4-di-tert-butylphenyl)pentaerythritol diphosphite, tristearylsorbitol triphosphate and tetrakis(2,4-di-tert-butylphenyl)-4,4'-biphenyldiphosphonite;

examples of organic phosphorus compounds are described in U.S. Pat. No. 6,444,733, phosphorus-containing compounds comprising sulfide, such as, for example, the following compounds:
trismethylthiophosphite,
trisethylthiophosphite,
trispropylthiophosphite,
trispentylthiophosphite,
trishexylthiophosphite,
trisheptylthiophosphite,
trisoctylthiophosphite,
trisnonylthiophosphite,
trislaurylthiophosphite,
trisphenylthiophosphite,
trisbenzylthiophosphite,
bispropiothiomethylphosphite,
bispropiothiononylphosphite,
bisnonylthiomethylphosphite,
bisnonylthiobutylphosphite,
methylethylthiobutylphosphite,
methylethylthiopropiophosphite,
methylnonylthiobutylphosphite,
methylnonylthiolaurylphosphite, and
pentylnonylthiolaurylphosphite; or
compounds comprising a sterically hindered group and a nitroxyl function are, for example, described in U.S. Pat. No. 6,337,426 or U.S. Pat. No. 5,254,760;
amines comprising sterically hindered groups, such as, for example, the following compounds: bis(2,2,6,6-tetramethyl-piperidyl) sebacate, bis(1,2,2,6,6-pentamethylpiperidyl) sebacate, n-butyl-3,5-di-tert-butyl-4-hydroxybenzyl malonic acid bis(1,2,2,6,6-pentamethylpiperidyl) ester, the product, of condensation between 1-hydroxyethyl-2,2,6,6-tetramethyl-4-hydroxypiperidine and succinic acid, the product of condensation between N,N'-(2,2,6,6-tetramethylpiperidyl)hexa-methylenediamine and 4-tert-octyl-amino-2,6-dichloro-s-triazine, tris(2,2,6,6-tetramethylpiperidyl) nitrilotriacetate, tetrakis(2,2,6,6-tetramethyl-4-piperidyl)-1,2,3,4-butanetetracarboxylate, and 1,1'-(1,2-ethanediyl)-bis(3,3,5,5-tetra-methylpiperazinone). Examples of amine stabilizers comprising sterically hindered groups and the use thereof are found in documents EP-162524, EP-920483 or EP-263561.

In general, the added amount of stabilizer varies according to its nature. By way of indication, amounts of between 1 and 3000 ppm are common when sterically hindered amines are involved.

According to the invention, the term "effective catalytic amount" or "effective amount" is intended to mean the amount sufficient to initiate polymerization and/or cross linking. Depending on the concentration of iodonium salt A in the composition Pf this amount will foe adjusted so as to add an amount of between 0.01 and 20 parts by weight of iodonium salt A, most commonly between 0.05 and 8 parts by weight in order to polymerize and/or crosslink 100 parts by weight of the cationically polymerizable and/or crosslinkable organosilicon compound D.

In one preferred embodiment, the compound D is organic in nature and bears organofunctional groups belonging to at least one of the following species:
α1.1 cycloaliphatic epoxides,
α1.2 non-cycloaliphatic epoxides,
α2 linear or cyclic alkenyl ethers,
α3 polyols, and
α4 oxetanes.

As examples of compounds D mention may be made of:
$\alpha_{1.1}$ cycloaliphatic epoxides, taken by themselves or as a mixture with one another:
epoxides of the type 3,4-epoxycyclohexylmethyl-3',4'-epoxycyclohexanecarboxylate:

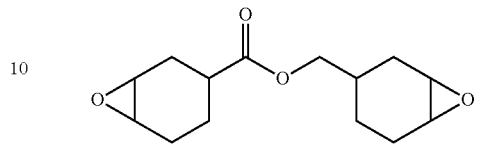

bis(3,4-epoxycyclohexyl)adipate;
3,4,2-methylcyclohexylmethyl-3,4-epoxy-2-methylcyclohexanecarboxylate;
bis(3,4-epoxy-6-methylcyclohexylmethyl)adipate, or
those mentioned in U.S. Pat. No. 3,117,099,
$\alpha_{1.2}$ non-cycloaliphatic epoxides, taken by themselves or as a mixture with one another:
epoxides of the type of those resulting from the condensation of bisphenol a and of epichlorohydrin, alkoxylated bisphenol A diglycidyl or triglycidyl ether, or those described in U.S. Pat. No. 3,018,262,
alpha-olefin epoxides, Novolac epoxide, epoxidized soybean and linseed oil, epoxidized polybutadiene, and more generally a saturated or unsaturated, epoxidized and monohydroxylated diene polymer, described in patent application WO-A-96/11215,
$\alpha_2$ linear or cyclic alkenyl ethers, taken by themselves or as a mixture with one another:
vinyl ethers, in particular triethylene glycol divinyl ether, cyclic vinyl ethers or acrolein tetramers and/or dimers,
propenyl ethers,
and butenyl ethers, which are more especially preferred,
$\alpha_3$ polyols: taken by themselves or as a mixture with one another, and preferably the compound having the formula below, I being greater than 1 and less than 100:

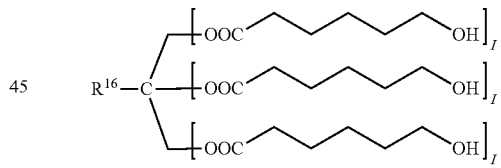

where $R^{16}$ is a linear or branched. $C_1$-$C_{30}$ alklyl radical, and
$\alpha_4$ bis-oxetanes: such as those described in U.S. Pat. No. 5,721,020.

It is also possible to envision compounds D containing an epoxy (oxirane) group and an oxetane group. Such compounds are described in patent application DE-196 47 848 A1. As specific example, mention may be made of: 3-((oxiranylmethoxy)methyl)oxetane or 3-alkyl((oxiranylmethoxy)methyl)oxetane wherein the alkyl group contains from 1 to 8 carbon atoms.

There are numerous commercial products in particular in the category of epoxy resins, such as: octadecylene oxide, epichlorohydrin, styrene oxide, vinylcyclohexene oxide, glycidol, glycidyl methacrylate, bisphenol A diglycidyl ether (for example those available under the trade name Epon 828, Epon 825, Epon 1004 or Epon 1010 from the company Shell Chemical Co., DER-331, DER-332 and DER-334 from the company Dow Chemical Co.), vinylcyclohexene dioxide (for example ERL-4206 from the company Union Carbide Corp.), 3,4-epoxycyclohexylmethyl-3,4-epoxycyclohexenecarboxylate (such as ERL-4221, Cyracure UVR 6110 or UVR 6105 from the company Union Carbide Corp.), 3,4-epoxy-6-methylcyclohexylmethyl-3,4-epoxy-6-methylcyclohexenecarboxylate (such, as ERL-4201 from the company Union Carbide Corp.), bis(3,4-epoxy-6-methylcyclohexylmethyl) adipate (such as ERL-4289 from the company Union Carbide Corp.), bis(2,3-epoxycyclopentyl) ether (such as ERL-0400 from the company Union Carbide Corp.), an aliphatic epoxy derived from polypropylene glycol (such as ERL-4050 and ERL-4052 from the company Union Carbide Corp.), an epoxidized polybutadiene (such as Oxiron 2001 from the company PMC Corp.), flame-retardant epoxy resins (such as DER-580, an epoxy resin of brominated bisphenol type from the company Dow Chemical Co.), phenol-formaldehyde novolac-derived 1,4-butanediol diglycidyl ether (such as DEN-431 and DEN-438 from the company Dow Chemical Co.), bis(3,4-epoxycyclohexyl)adipate (such as ERL-4299 or UVR-6128, from the company Union Carbide Corp.), 2-(3,4-epoxycyclohexyl-5,5-spiro-3,4-epoxy)cyclohexane-metadioxane (such as ERL-4234 from the company Union Carbide Corp.), vinylcyclohexene monoxide 1,2-epoxyhexadecane (such as UVR-6216 from the company Union Carbide Corp.) an alkyl glycidyl ether, such as a $C_8$-$C_{10}$ alkyl glycidyl ether (such as Heloxy Modifier 7 from the company Shell Chemical Co.), a $C_{12}$-$C_{14}$ alkyl glycidyl ether (such as Heloxy Modifier 8 from the company Shell Chemical Co.), a butyl glycidyl ether (such as Heloxy Modifier 61 from the company Shell Chemical Co.), a cresyl glycidyl ether (such as Heloxy Modifier 62 from the company Shell Chemical Co.), p-tert-butylphenyl glycidyl ether (such as Heloxy Modifier 65 from the company Shell Chemical Co.), a neopentyl glycol diglycidyl ether (such as Heloxy Modifier 68 from the company Shell Chemical Co.), a cyclohexanedimethanol diglycidyl ether (such as Heloxy Modifier 107 from the company Shell Chemical Co.), trimethyloiethane triglycidyl ether (such as Heloxy Modifier 44 from the company Shell Chemical Co.), trimethylolpropane triglycidyl ether (such as Heloxy Modifier 48 from the company Shell Chemical Co.), a polyglycidyl ether of an aliphatic polyol (such as Heloxy Modifier 84 from the company Shell Chemical Co.), a polyglycol diepoxide (such as Heloxy Modifier 32 from the company Shell Chemical Co.), bisphenol F epoxides (such as EPN-1138 or GY-281 from the company Ciba-Geigy Corp.) and 9,9-bis[4-(2,3-epoxypropoxy)phenyl]fluorenone (such as Epon 1079 from the company Shell Chemical Co.).

The monomer, oligomer or polymer H having organofunctional groups of acrylate kind has, for example, epoxidized acrylate, polyester glycerol acrylate, multifunctional acrylate, urethane acrylate, polyether acrylate, unsaturated polyester, polyester acrylate or acrylic acrylate functions.

These acrylic species, optionally as a mixture, are preferably chosen from the following species: trimethylolpropane triacrylate, tripropylene glycol diacrylate, glycidylpropyl triacrylate, pentaerythritol triacrylate, trimethylolpropane ethoxylate triacrylate, bisphenol A ethoxylate diacrylate, tripropylene glycol diacrylate, triethylene glycol diacrylate, tetraethylene glycol diacrylate, polyether acrylates, polyester acrylates (for example the product Ebecryl 810 from the company Cytec), and epoxy acrylates (for example the product Ebecryl® 600 from the company Cytec).

It is recalled that, in the present report, the expression "'acrylic'" encompasses compounds comprising the function of $CH_2$=CH—(CO)—O— type or of $CH_2$=C($CH_3$)—(CO)—O— type.

The photosensitizer E is chosen from molecules which absorb wavelengths different than those absorbed by the photoinitiator in order to thus make it possible to extend their spectral sensitivity. Its mode of action is more commonly known as "photosensitization" which consists of an energy transfer from the excited photosensitizer to the photoinitiator. Thus, the photosensitizer increases the fraction of light absorbed by the initiator and therefore the photolysis yield. Thus, a greater amount of reactive species is generated and, consequently, the polymerization is more rapid. There is a large number of photosensitizers well known to those skilled in the art. Preferably, the photosensitizer will be chosen according to the following criteria:

The energy of its excited state is greater than that of the photoinitiator, its absorption spectrum is in a region where fillers and pigments do not absorb, and it is chemically inert.

As examples of photosensitizers E, mention may be made of: anthracene, pyrene, phenothiazine, Michler's ketone, xanthones, thioxanthones, benzophenone, acetophenone, carbazole derivatives, fluorenone, anthraquinone, camphorquinone or acylphosphine oxides.

In particular, the photosensitizer E can also be chosen:

from the diether anthracenes having the following formulae:

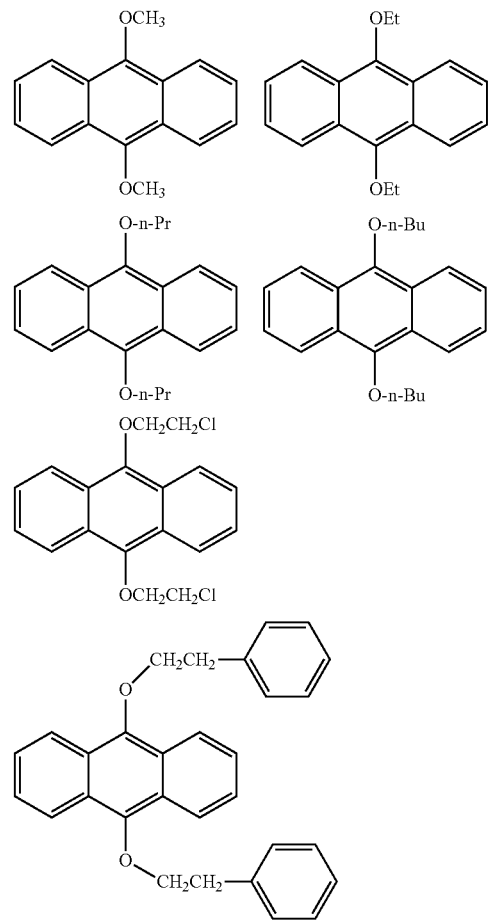

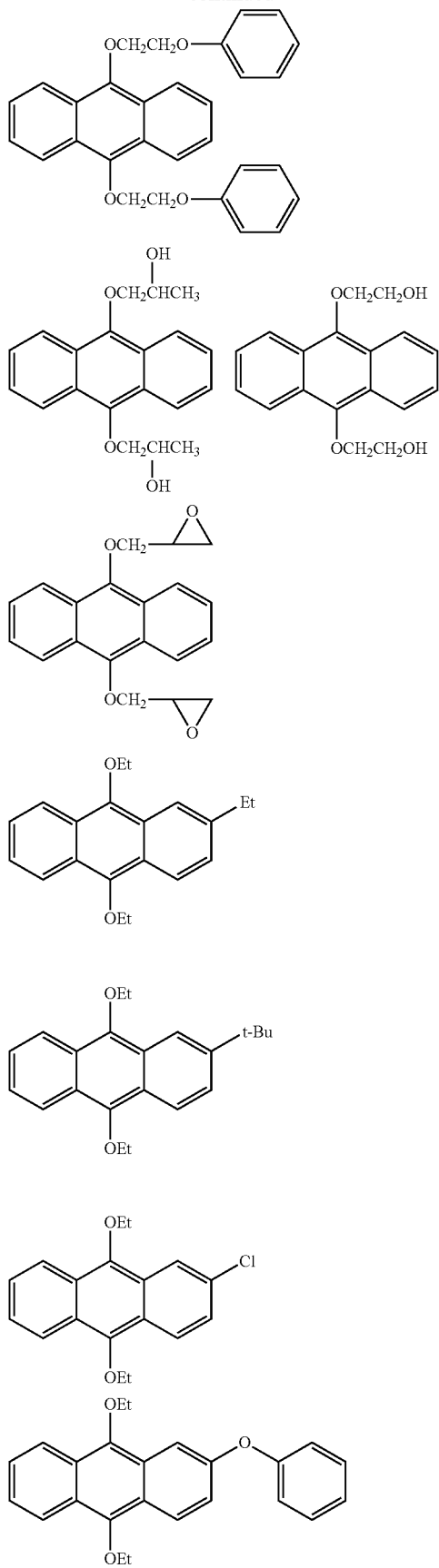
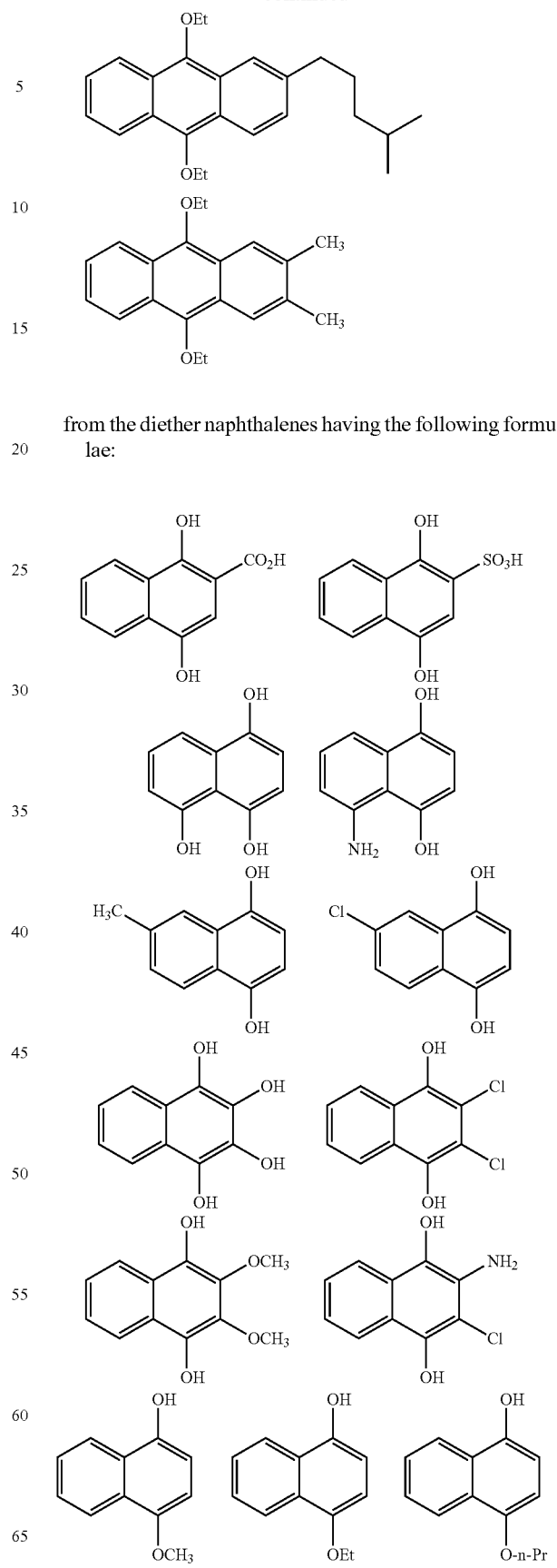
from the diether naphthalenes having the following formulae:

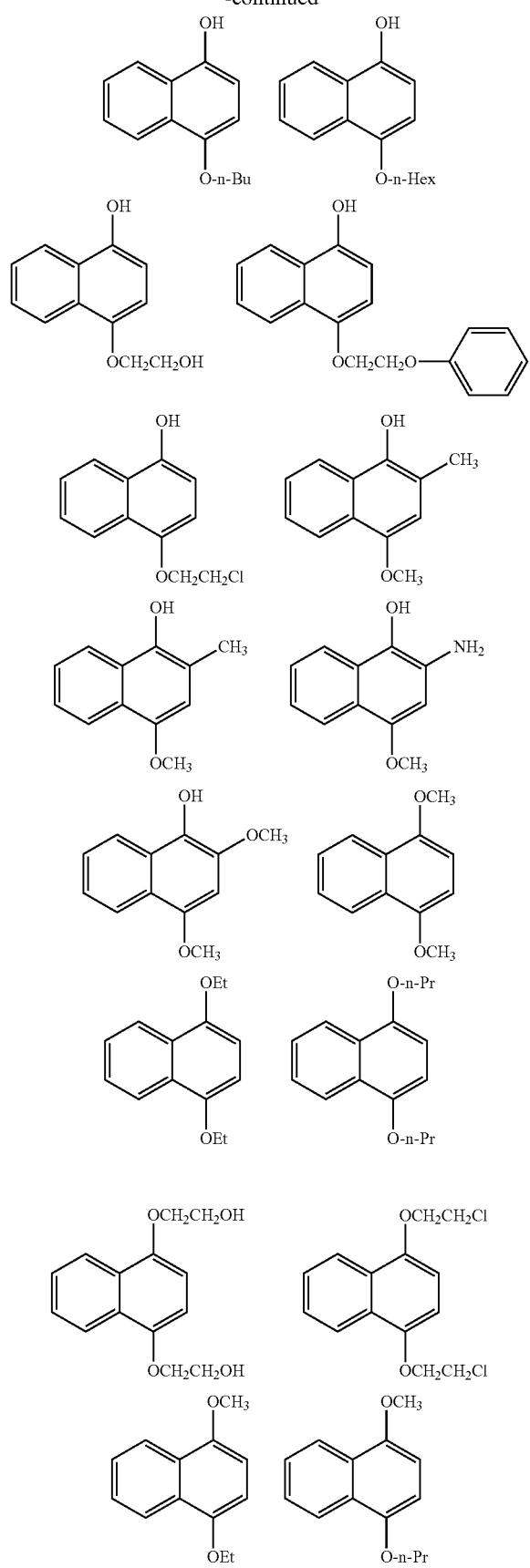
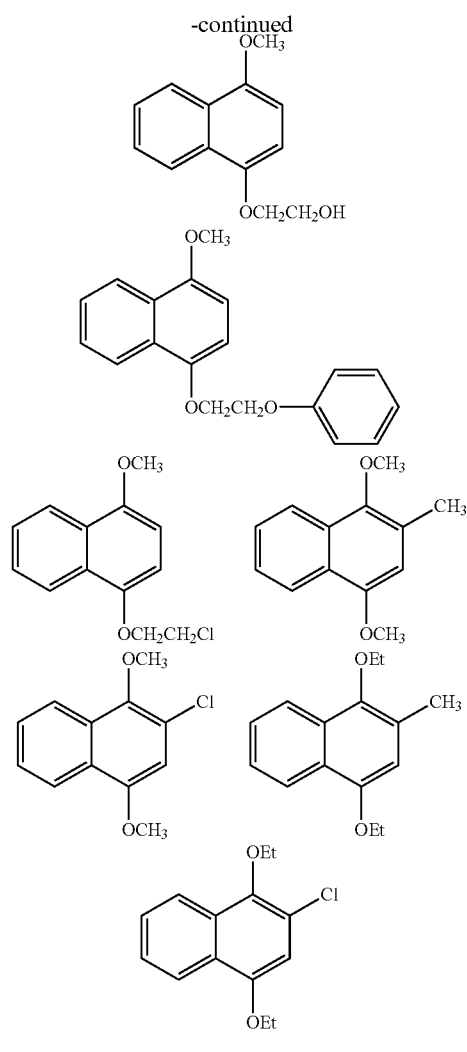
or from the diether benzenes having the following formulae:
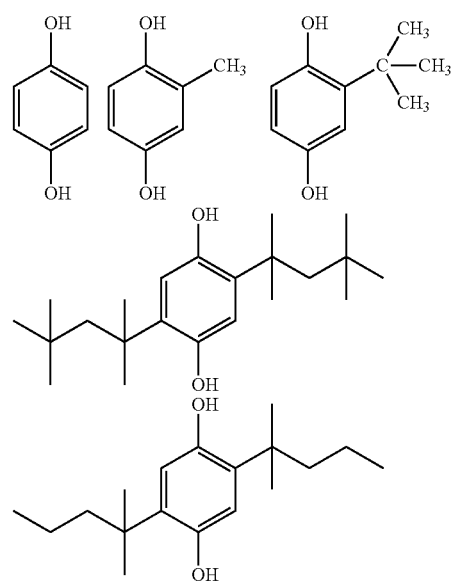

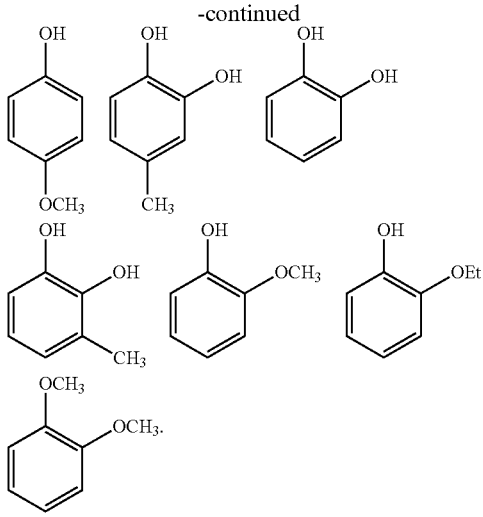

These photosensitizers are described in particular in document WO-A-2006/073021. Mention may also be made of aromatic hydrocarbon-based photosensitizers containing one or more substituted or unsubstituted aromatic nuclei, having a residual absorption of light between 200 and 500 nm, such as those of formulae (IV) to (XI) and (XIII) to (XXII) described from page 8 to page 15 of document WO-A-00/19966 or else at least one of the benzophenones described on page 4, line 33 to page 7, line 12, and page 8, line 9 line 13 of document WO-A-99/05181. By way of example, mention may be made of the following compounds:

4,4'-dimethoxybenzoin; phenanthrenequinone; 2-ethylanthraquinone; 2-methylanthraquinone; 1,8-dihydroxyanthraquinone; dibenzoyl peroxide; 2,2-dimethoxy-2-phenylacetophenone; benzoin; 2-hydroxy-2-methylpropiophenone; benzaldehyde; 4-(2-hydroxyethoxy)phenyl(2-hydroxy-2-methylpropyl) ketone; benzoylacetone;

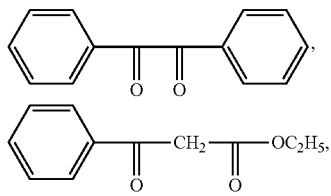

2-isopropylthioxanthone; 1-chloro-4-propoxythio-xanthone; 4-isopropylthioxanthone; 2,4-diethyl thioxanthone; camphorquinone; and a mixture thereof.

Other photosensitizers can be used. In particular, use may be made of the photosensitizers described in documents U.S. Pat. No. 4,939,069, U.S. Pat. No. 4,278,751 and U.S. Pat. No. 4,147,552.

Mention may also be made of the photosensitizers mentioned in patent application WO 2005/070989, such as:

in the thioxanthone family: thioxanthone, 2-isopropylthioxanthone, 2-chlorothioxanthone, 2-dodecylthioxanthone, 2,4-diethylthioxanthone, 2,4-dimethylthioxanthone, 1-methoxycarbonyl-thioxanthone, 2-ethoxycarbonylthioxanthone, 3-(2-methoxyethoxycarbonyl)thioxanthone, 4-butoxycarbonylthioxanthone, 3-butoxycarbonyl-7-methylthioxantnone, 1-chloro-4-propoxythioxanthone, 1-cyano-3-chlorothioxanthone, 1-ethoxycarbonyl-3-chlorotrioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di-[2-(2-methoxyethoxy)ethoxycarbonyl]-thioxanthone, 1-ethoxycarbonyl-3-(1-methyl-1-morpholinoethyl)thioxanthone, 2-methyl-6-dimethoxymethylthioxanthone, 2-methyl-6-(1,1-dimethoxybenzyl) thioxanthone, 2-morpholinomethylthioxanthone, 2-methyl-6-morpholinomethylthioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 1-phenoxythioxanthone, 6-ethoxycarbonyl-2-methoxythioxanthone, 6-ethoxycarbonyl-2-methylthioxanthone, 1,3-dimethyl-2-hydroxy-9H-tioxanthen-9-one-2-ethylhexyl ether thioxanthone-2-polyethylene glycol ester, 2-hydroxy-3-(3,4-dimethyl-9-oxo-9H-thioxanthon-2-yloxy)-N,N,N-trimethyl-1-propanaminiam chloride;

in the benzophenone family: benzophenone, 4-phenylbenzophenone, 4-methoxybenzophenone, 4,4'-dimethoxybenzophenone, 4,4'-dimethylbenzo-phenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)-benzophenone, 3,3'-dimethyl-4-methoxybenzophenone, 2-methylbenzoyl benzoate, 4-(2-hydroxyethylthio)benzophenone, 4-(4-tolylthiobenzoohenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)benzophenone, 4-benzoyl-N,N-dimethyl-N-[2-(1-oxo-2-propenyl)oxy]ethylbenzenemethanaminium chloride;

in the 3-acylcoumarin family: 3-benzoyl-coumarin, 3-benzoyl-7-methoxycoumarin, 3-benzoyl-5,7-di(propoxy)coumarin, 3-benzoyl-6,8-dichlorocoumarin, 3-benzoyl-6-chloro-coumarin, 3,3'-carbonyl-bis[5,7-di(propoxy)-coumarin], 3,3'-carbonyl-bis[7-methoxy-coumarin), 3,3'-carbonyl-bis(7-diethylamino-coumarin), 3-isobutyroylcoumarin, 3-benzoyl-5,7-dimethoxycoumarin, 3-benzoyl-5,7-diethoxy-coumarin, 3-benzoyl-5,7-dibutoxycoumarin, 3-benzoyl-5,7-di(methoxyethoxy)coumarin, 3-benzoyl-5,7-di(allyloxy)coumarin, 3-benzoyl-7-dimethylaminocoumarin, 3-benzoyl-7-diethylaminocoumarin, 3-isobutyroyl-7-dimethylaminocoumarin, 5,7-dimethoxy-3-(1-naphthoyl)-coumarin, 3,7-dimethoxy-3-(1-naphthoyl)-coumarin, 3-benzoylbenzo[f]coumarin, 7-diethyl-amino-3-thienoylcoumarin, 3-(4-cyanobenzoyl)-5,7-dimethoxycoumarin;

in the 3-(aroylmethylene)thiazoline family: 3-methyl-2-benzoylmethylene-5-napthothiazoline, 3-methyl-2-benzoylmethylenebenzothiazoline, 3-ethyl-2-propionylmethylene-p-naphtho-thiazoline;

or in the ketone family: acetophenone, 3-ethoxyacetophenone, 4-phenylacetophenone, Benzyl-2-acetylnaphthalene, 2-naphthaldehyde, 9,10-anthraquinone, 9-fluorene, dibenzo-suberone, xanthone, 2,5-bis(4-diethylaminobenzylidene)cyclopentanone, α-(para-dimethylaminobenzylidene) ketones, such as 2-(4-dimethylaminobenzylidene)indan-1-one or 3-(4-dimethylaminophenyl)-1-indan-5-ylpropenone, 2-benzoyl-3-(4-dimethylaminophenyl) 2-propenenitrile, 3-phenylthiophthalimide, N-methyl-3,5-di(ethylthio)phthalimide and N-methyl-3,5-di(ethylthio)phthalimide.

Other examples of photosensitizers are described in U.S. Pat. No. 6,025,406. When it is present in the composition, the photosensitizer is added in an amount of from 0.05% to 10% by weight relative to the total weight of the composition to be poiymerized/crosslinked and preferably between 0.1% and 2% by weight relative to the total weight of the composition to be polymerized/cross linked.

As examples of additive Q, mention may be made of adhesion modulators (linear silicone resins or polymers bearing vinyl, epoxy, vinyl ether, hydroxyl, etc., functions), pigments, inorganic fillers such as, in particular, synthetic fibers (polymers) or natural fibers which have been ground, calcium, carbonate, talc, clay, titanium dioxide, precipitated or fumed silica; soluble dyes; oxidation and corrosion inhibitors; fungicidal, bactericidal, antimicrobial agents; and/or any other material which does not interfere with the catalytic activity of the initiator and which does not absorb in the wavelength range chosen for the photoactivation.

The cationically polymerizable and/or crosslinkable composition R can be used as it is or in solution in an organic solvent F. It is of use as a thin layer in the field of coatings, in paints, and also as a thick layer for encapsulating electrical and electronic components, coatings for textiles, and inks.

When it is a question of inks, the composition R may also comprise water so as to control the viscosity. In addition, pigments and/or dyes may be incorporated into the composition R in order to produce water-based inks having excellent rheology, which are suitable for a broad range of printing applications ranging from Inkjet inks to pasty inks with a higher viscosity. In the ink applications, it is also possible to add adjuvants well known to those skilled in the art, such as surfactants, leveling agents, wetting agents, dispersants, antifoams, etc.

The expression "under activation which is actinic" means that the composition is activated by radiation having a wavelength range from approximately 190 nm to approximately 400 nm. Actinic radiation of this type can be obtained from numerous sources, for example mercury arc lamps, xenon arc lamps, fluorescent lamps or monochromatic laser sources.

According to one particular embodiment, the crosslinking operation is carried out by UV radiation having a wavelength of about 200 to 400 nanometers. The irradiation time may be short and it is generally less than 1 second and is about a few hundredths of a second for small coating thicknesses. The crosslinking obtained is excellent even in the absence of any heating. Of course, heating between 25 and 200° C. is not excluded from the invention. Of course, the curing time can be adjusted in particular by the number of UV lamps used, by the UV exposure time and by the distance between the composition and the UV lamp. The compositions R according to the invention without solvent, i.e. undiluted, are applied using devices capable of uniformly depositing small amounts of liquids. For this purpose, it is possible to use, for example, the device known as "Sliding helio" containing, in particular, two superimposed cylinders: the role of the bottommost cylinder, which is immersed in the coating tank containing the composition, is to impregnate the uppermost cylinder with a very thin layer. The role of the uppermost layer is then to deposit the desired amounts of composition with which it is impregnated on the substrate, for example a paper substrate. Such quantitative charging is obtained by adjusting the respective speed of the two cylinders which rotate in opposite directions with respect to one another. The amounts of compositions deposited on the substrates are variable and most often range between 0.1 and 5 g/m² of surface treated. These amounts depend on the nature of the substrates and on the desired non-stick properties. They are most often between 0.5 and 1.5 g/m² for non-porous substrates.

The cationically polymerizable and/or crosslinkable composition R of the invention may also be used in thicker layers (>5 micrometers), as a tropicalization varnish ("conformal coating"), the role of which is to electrically insulate the components and the circuits of an assembly and to keep them sheltered from the external environment and from the mechanical factors which can compromise the performance level of the assembly. Said composition can then be applied by spraying or by immersion, or else by brushing; the thicknesses of the coatings thus formed depend on the method of application chosen and most often vary from 5 micrometers to a few tenths of a millimeter; a subsequent polymerization step may, in certain cases, be necessary; the latter can be accomplished by a heat treatment.

The invention also relates to a process for producing a hard film or coating, comprising the following steps:
1. preparing a cationically polymerizable and/or crosslinkable composition R as defined in any one of claims 1 to 11;
2. applying the mixture obtained to a support; and
3. hardening the composition by polymerization and/or crosslinking into a film or coating thermally or actinically.

A subject of the present invention is also a film or coating obtained from the crosslinking of the composition R according to the invention and as defined above, thermally or actinically. Another subject of the invention consists of an article, at least one surface of which is coated with a film, or a coating obtained according to the process according to the invention and as defined, above. This will involve, for example, articles (sheets for example) consisting of a solid material (metal, glass, plastic, paper, etc.), at least one surface of which is coated with the composition R described above and crosslinked thermally or actinically.

Another subject of the invention, consists of a printing ink prepared from the composition R according to fine invention and as described above.

Finally, the last subject of the invention consists of a substrate or object, at least one of the surfaces of which is coated with a film or a coating according to the invention and as defined above.

The following examples are given by way of illustration. They will make it possible in particular to understand the invention more clearly, to reveal ail its advantages and to see some of its implementation variants.

EXAMPLES

1) Synthesis of the Photoinitiator [$(C_{12}H_{25})$—Ph—I—Ph($C_{12}H_{25}$)]$^+$; $^{-B[C_6F_5]_4}$ and Preparation of a Composition That is of Use as a Cationic Photoinitiator According to the Invention Dodecylbenzene (100 g; 0.45 mol), potassium iodate (43.5 g; 0.203 mol), acetic acid (199.6 g) and acetic anhydride (59.5 g) are charged to a 1-liter round-bottom flask equipped with a mechanical stirrer, a water-cooled reflux condenser and a dropping funnel.

The mixture is stirred and cooled in an ice bath at 0° C. The dropping tunnel is charged with a mixture of sulfuric acid (59.8 g) and acetic acid (39.86 g). This mixture is added to the reaction mass over the course of 25 minutes. The mixture is then allowed to return to ambient temperature (20° C.), and is then left to stir at ambient temperature for 18 hours. Water (750 ml) is then added and the reaction mass is then extracted with three fractions of ether (3×350 ml). The ethereal phases are combined and then evaporated under reduced pressure. The concentrate is taken up with a saturated solution of sodium chloride (540 ml), and then the mixture is cooled in an ice bath for two hours. The product is recovered by filtration through sintered glass No. 4. The solid is then recrystallized twice from acetone and bisdodecylphenyliodonium chloride is recovered by filtration, 13.05 g of the previous compound, 14.36 g of potassium tetrakis(pentafluorobenzene)borate and 160 g of methanol are taken and stirring is carried out for half an hour at ambient temperature in the dark. The mixture is left to stand for 12 hours and filtration is carried out followed by devoiatilization at 60° C. under 0.8 bar.

The product A1 obtained is an oil, there being 25.8 g. This photoinitiator is then mixed into a Guerbet alcohol so as to obtain a composition chat is of use as a cationic photoinitiator according to the invention.

2) Synthesis of the Photoinitiator [($C_nH_{2n+1}$)—Ph—I—Ph ($C_nH_{2n+1}$)]$^+$; $^-B[C_6F_5]_4$ n=10–13 and Preparation of a Composition That is of Use as a Cationic Photoinitiator According to the Invention A ($C_{10}C_{13}$)alkylbenzene fraction (100 g), potassium iodate (43.5 g; 0.203 mol), acetic acid (199.6 g) and acetic anhydride (59.5 g) are charged to a 1-liter round-bottom flask equipped with a mechanical stirrer, a water-cooled reflux condenser and a dropping funnel. The mixture is stirred and cooled in an ice bath at 0° C. A mixture of sulfuric acid (59.8 g) and acetic acid (39.86 g) is charged to the dropping funnel. This mixture is added to the reaction mass over the course of 25 minutes. The mixture is then allowed to return to ambient temperature, and then left to stir at ambient temperature for 18 hours. 750 ml of water are then added and the reaction mass is then extracted with three fractions of ether (3×350 ml). The ethereal phases are combined and then evaporated under reduced pressure. The concentrate is taken up with a 10% sodium tetrakis(pentafluorobenzene)borate solution (1500 ml), and then left to react in the dark with slow stirring for 12 hours. The reaction mass is extracted with three fractions of ether (3×350 ml).

The ethereal phases are combined and then evaporated under reduced pressure.

The product A2, which is an oil, is obtained (225.3 g).

The NMR analysis shows a distribution of $C_{10}$-$C_{13}$ alkylbenzene with a mixture of three products (63%, 20% and 17% by weight) which differ from one another by virtue of their cationic part. This photoinitiator is then mixed into a Guerbet alcohol so as to obtain a composition that is of use as a cationic photoinitiator according to the invention.

3) Preparation Process According to the Invention: Synthesis of the Photoinitiator [($C_nH_{2n+1}$)—Ph—I—Ph ($C_nH_{2n+1}$)]$^+$; $^-B[C_6F_5]_4$ n=10–13 Directly in a Guerbet Alcohol The manipulations (tests 1, 2 and 3; are carried out in a three-necked round-bottom flask equipped with a reflux condenser, a dropping funnel and a thermometer probe according to the following protocol (the respective amounts of the constituents are mentioned in Tables 1 and 2):

An amount of bis($C_{10-13}$)alkylphenyliodonium iodide and then the Guerbet alcohol Isofol® 20 (octyldodecanol) are charged, followed by mechanical stirring (510 rpm), heating is carried out at 65° C. while awaiting total solubilization of the bis($C_{10-13}$)alkylphenyliodonium iodide, the aqueous solution of sodium tetrakis(pentafluorophenyl)borate is run in, the mixture is left to stir for 4 h at 65° C., the mixture is transferred into a separating funnel and, after a return to ambient temperature (over a period of 24 h), the phases are separated, the organic phase is washed 3 times with 100 g of deionized water, and the organic phase is devoiatilized: for 4 h, at 70° C., under reduced pressure at 5 mbar so as to obtain the composition that is of use as a cationic photoinitiator according to the invention.

TABLE 1

Preparation of compositions that are of use as cationic photoinitiator (20% by mass of iodonium salt in the Guerbet alcohol Isofol® 20 - octyldodecanol)

|  | Test 1 | | Test 2 | |
| --- | --- | --- | --- | --- |
|  | Mass (g) | Amount (mol) | Mass (g) | Amount (mol) |
| Guerbet alcohol Isofol® 20 (octyldodecanol) | 50.09 | 0.168 | 50.02 | 0.168 |
| bis($C_{10-13}$)alkylphenyl-iodonium iodide | 7.18 | $9.84 \times 10^{-3}$ | 7.11 | $9.74 \times 10^{-3}$ |
| Aqueous solution at 10.4% by mass of sodium tetrakis(pentafluoro-phenyl)borate | 74.5 | $11.04 \times 10^{-3}$ | — | — |
| Aqueous solution at 4.6% by mass of sodium tetrakis(pentafluoro-phenyl)borate | — | — | 155.09 | $10.16 \times 10^{-3}$ |

TABLE 2

Preparation of a composition that is of use as a cationic photoinitiator (50% by mass of iodonium salt in the Guerbet alcohol Isofol® 20 - octyldodecanol)
Test 3

|  | Mass (g) | Amount (mol) |
| --- | --- | --- |
| Guerbet alcohol Isofol® 20 (octyldodecanol) | 15.02 | 0.050 |
| bis($C_{10-13}$)alkylphenyliodonium iodide | 7.11 | $9.74 \times 10^{-3}$ |
| Aqueous solution at 10.4% by mass of sodium tetrakis(penta-fluorophenyl)borate | 74.5 | $11.04 \times 10^{-3}$ |

4) Mass Reactivity Under Ultraviolet Radiation

For these examples, the cationically polymerizable and/or crosslinkable organic compound D not containing a silicon atom is the compound 3,4-epoxycyclohexylmethyl-3,4-epoxycyclohexylcarboxylate [RN CAS=2385-87-0]. More particularly, a commercial sample from Dow Chemical, UVR-6105, is used.

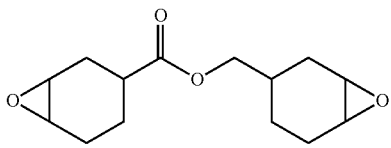

5) Stability of the Photoinitiator Compositions Using the Various Solvents

Table 4 below summarizes the tests for stability with respect to aging of the photoinitiator compositions obtained by mixing from 40% to 50% by weight by mass of photoinitiator A2 in various Guerbet alcohols (I1 and I2). The aging is accelerated by applying a temperature of 60° C. for 15 days.

TABLE 3

Structures of the various products used in the tests

| Constituents | | Chemical structures |
|---|---|---|
| A2 | Iodonium salt (invention) | $H_{(21-27)}C_{(10-13)}$—⌬—$I^{\oplus}$—⌬—$C_{(10-13)}H_{(21-27)}$    $[B(C_6F_5)]^{\ominus}_4$ |
| A-comp | Iodonium salt (comparative) | (isopropyl)—⌬—$I^{\oplus}$—⌬—    $[B(C_6F_5)]^{\ominus}_4$ |
| F | Isopropanol (solvent/hydrogen donor comparative) | $CH_3$—$CH(OH)$—$CH_3$ |
| I1 | Butyloctanol (Guerbet $C_{12}$) | $H_{2n-3}C_{n-2}$—$\overset{C_nH_{2n+1}}{\underset{\|}{CH}}$—$CH_2$—$OH$  with n = 6 |
| I2 | Octyldodecanol (Guerbet $C_{20}$) (solvent/hydrogen donor invention) | $H_{2n-3}C_{n-2}$—$\overset{C_nH_{2n+1}}{\underset{\|}{CH}}$—$CH_2$—$OH$  with n = 10 |

Mixtures of iodonium salt/solvent/hydrogen donor+organic compound D are prepared, 1.4 g of each mixture is then placed in a tank of polymethylmethacrylate (PMMA). A vibrating needle (frequency 100 Hz) is immersed in this tank to a depth of 2 mm from the bottom. The polymerization reaction is initiated when the bottom of the tank is subjected to UV radiation by means of an optical fiber. With the polymerization advancing, the viscosity of the medium increased until a gel is obtained. This increase in viscosity creates a resistance to the vibration of the needle. This leads to a difference in potential which makes it possible to determine the gel time. The mixtures produced use an equimolar amount of iodonium salt A2 (invention) or of another iodonium salt A-comp (comparative), i.e. 0.088 mmol for 20 g of the system to be UV-polymerized (constituent D) and thus allow a direct comparison of the efficiency of the compositions tested as photoinitiator.

The show that the use of a photoinitiator composition according to the invention makes it possible to very substantially improve the reactivity of the system to be polymerized.

TABLE 5

Stability with respect to aging of the photoinitiator compositions according to the invention

| Test No. | Solvent | Solution after 1 day | Solution after 15 days at 60° C. |
|---|---|---|---|
| 12 | I1 | Clear, liquid | Clear, liquid |
| 13 | I2 | Clear, liquid | Clear, liquid |

Tests 12 and 13 show that the photoinitiator compositions according to the invention remain homogeneous and stable with respect to aging.

6) Stabilization of the Photoinitiator Composition

A variable amount of stabilizer (Tinavin® 292 from the company CIBA, which is a mixture of bis(1,2,2,6,6-pentamethyl-4-piperidinyl) sebacate and 1-(methyl)-8-(1,2,2,6,6-piperidinyl) sebacate) is added to a photoinitiator composition containing 70% by mass of iodonium salt A2 and 30% by mass of a $C_{20}$ Guerbet alcohol (I2). These various compositions are stored at 20, 40 and 60° C., pH measurements (0.175 g of the photoinitiator composition in 15 g of isopropanol) are carried out. The pH-meter used (Schott, CG825) is equipped with a glass electrode (Schott Instruments, N52A) which is calibrated before each measurement series with buffer solutions of pH=4 and pH=7. The pH values are noted after the solutions have been left to stand for 5 minutes following stirring for 3 minutes with a magnetic bar.

TABLE 5

Stability with respect to aging of the photoinitiator compositions according to the invention

| Test No. | Stabilizer (ppm) | Storage temperature (°C.) | Initial pH | pH after 1 week of storage | pH after 4 weeks of storage | pH after 8 weeks of storage |
|---|---|---|---|---|---|---|
| 14 | 0 | 20 | 5.67 | 5.88 | 6.28 | 5.60 |
| 15 | 0 | 40 | 5.67 | 5.91 | 6.19 | 6.08 |
| 16 | 0 | 60 | 5.67 | 5.81 | 3.21 | 2.83 |
| 17 | 1007 | 20 | 6.35 | 6.08 | 6.24 | 5.87 |
| 18 | 1007 | 40 | 6.35 | 5.90 | 5.97 | 5.64 |
| 19 | 1007 | 60 | 6.35 | 5.61 | 5.36 | 3.58 |
| 20 | 4941 | 20 | 6.89 | 6.52 | 6.44 | 6.14 |
| 21 | 4941 | 40 | 6.89 | 6.19 | 5.96 | 5.80 |
| 22 | 4941 | 60 | 6.89 | 5.75 | 5.25 | 4.53 |

Tests No. 19 and 22 show that the addition of a stabilizer to a photoinitiator composition according to the invention makes it possible to stabilize the pH during storage over a long period of time. A pH value that is too low (below 4) makes the solution unusable in cationic systems which are reactive under UV.

7) Impact on the Odor of the Final Product and During Coating

Numerous coatings presented above were evaluated according to the following method: 0.5 m² of substrate is recovered at the machine outlet, immediately after coating and insulation using UV lamps. This sample is placed in a hermetically closed, clean 1-liter jam jar. After 24, a panel of four individuals evaluates, blind, the intensity of the odor perceived in this jam jar.

The coatings were carried out as presented above. The grades 0 to 5 given by the experimenters are added. Thus, the lowest value corresponds to the least pronounced odor and vice versa for the highest grade. The tests according to the invention (Inv.) exhibit a weaker odor than the comparative tests which use the photoinitiator A-Comp in isopropanol, which is an iodonium salt widely used in the cationic coating industry.

The invention claimed is:

1. A composition R which is polymerizable and/or crosslinkable cationically, under activation which is thermal and/or actinic and/or by an electron beam, the composition comprising:
   1) at least one cationically polymerizable and/or crosslinkable organic compound D that does not contain a silicon atom;
   2) an effective catalytic amount of a cationic photoinitiator composition P comprising:

a) at least one iodonium salt A of formula (I)' below:

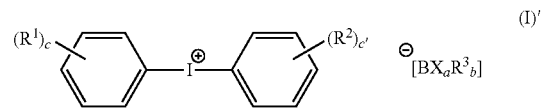

wherein:
   the symbols $R^1$ and $R^2$ are identical or different, and each represent a linear or branched alkyl radical having from 10 to 30 carbon atoms,
   a and b are integers such that $0 \leq a \leq 3$, $1 \leq b \leq 4$ and $a+b=4$,
   c and c' are integers, which are identical or different, ranging from 1 to 5,
   the symbols X, which are identical or different, represent a chlorine or fluorine atom with $0 \leq a \leq 3$, or an OH function with $0 \leq a \leq 2$, and
   the symbols $R^3$, which are identical or different, represent a phenyl radical substituted with at least 2 halogen atoms or at least one electron-withdrawing group selected from the group consisting of: —$CF_3$, —$OCF_3$, —$NO_2$, —CN, —$SO_2$—$C_nF_{2n+}$, —(CO)—$C_nF_{2n+1}$, —O—$C_nF_{2n+1}$ and —$C_nF_{2n+1}$, with n being an integer from 1 to 20, or an aryl radical containing at least two aromatic nuclei, optionally substituted with at least one halogen atom or an electron-withdrawing group selected form the group consisting of: —$CF_3$, —$OCF_3$, —$NO_2$, —CN, —$SO_2$—$C_nF_{2n+}$, —(CO)—$C_nF_{2n+1}$, —O—$C_nF_{2n+1}$ and —$C_nF_{2n+1}$, with n being an integer from 1 to 20,
   b) at least one hydrogen donor B selected from the group consisting of Guerbet alcohols of formula (II) below:

wherein:
   the symbols $R^4$ and $R^5$ are identical or different, and each represent an alkyl radical having from 4 to 12 carbon atoms, and
   with the additional condition that the total number of carbon atoms of said Guerbet alcohol is from 10 to 20 carbon atoms, and
   c) optionally at least one thermal stabilizer C,
   3) optionally an effective amount of at least one photosensitizer E,
   4) optionally at least one organic solvent F,
   5) optionally at least one additive Q, and
   6) optionally at least one thermal stabilizer C.

2. The composition R as claimed in claim 1, comprising:
   1) at least one cationically polymerizable and/or crosslinkable organic compound D that does not contain a silicon atom;
   2) an effective catalytic amount of a cationic photoinitiator composition P comprising:
   a) at least one iodonium salt A of formula (I) below:

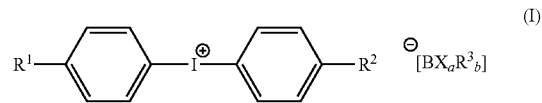

wherein:
the symbols R¹ and R² are identical or different, and each represent a linear or branched alkyl radical having from 10 to 30 carbon atoms
a and b are integers such that 0≤a≤3, 1≤b≤4 and a+b=4,
the symbols X, which are identical or different, represent a chlorine or fluorine atom with 0≤a≤3, or an OH function with 0≤a≤2, and
the symbols R³, which are identical or different, represent a phenyl radical substituted with at least 2 halogen atoms or at least one electron-withdrawing group selected from the group consisting of: —CF₃, —OCF₃, —NO₂, —CN, —SO₂—C$_n$F$_{2n+}$, —(CO)—C$_n$F$_{2n+1}$ and —C$_n$F$_{2n+1}$, with n being an integer from 1 to 20, or an aryl radical containing at least two aromatic nuclei, optionally substituted with at least one halogen atom or an electron-withdrawing group selected from the group consisting of: —CF₃, —OCF₃, —NO₂, —CN, —SO₂—C$_n$F$_{2n+}$, —(CO)—C$_n$F$_{2n+1}$, —O—C$_n$F$_{2n+1}$ and C$_n$F$_{2n+1}$, with n being an integer from 1 to 20,
b) at least one hydrogen donor B selected from the group consisting of Guerbet alcohols of formula (II) below:

   (II)

wherein:
the symbols R⁴ and R⁵ are identical or different, and each represent an alkyl radical having from 4 to 12 carbon atoms, and
with the additional condition that the total number of carbon atoms of said Guerbet alcohol is from 10 to 20 carbon atoms, and
c) optionally at least one thermal stabilizer C,
3) optionally an effective amount of at least one photosensitizer E,
4) optionally at least one organic solvent F,
5) optionally at least one additive Q, and
6) optionally at least one thermal stabilizer C.

3. The composition R as claimed in claim 1, wherein the anion of the iodonium salt A is selected from the group consisting of the following anions: [B(C₆F₅)₄]⁻, [B(C₆H₃(CF₃)₂)₄]⁻, [B(C₆H₄OCF₃)₄]⁻, [B(C₆H₄CF₃)₄]⁻, [(C₆F₅)₂BF₂]⁻, (C₆F₅BF₃)⁻ and [B(C₆H₃F₂)₄]⁻.

4. The composition R as claimed in claim 1, wherein the hydrogen donor B is a Guerbet alcohol which has the formula below:

   (III)

wherein the symbol n is an integer from 5 to 10.

5. The composition R as claimed in claim 1, wherein the hydrogen donor B is selected from the group consisting of the following Guerbet alcohols: 2-butyl-1-octanol, 2-pentyl-1-nonanol, 2-hexyldecan-1-ol, 2-octyldecan-1-ol and 2-octyldodecan-1-ol, and mixtures thereof.

6. The composition R as claimed in claim 1, wherein the catonic photoinitiator composition P comprises:
a) 1 to 95 parts by weight relative to the total weight of the composition P, of the iodonium salt(s) A,
b) 5 to 99 parts by weight relative to the total weight of the composition P, of at least one hydrogen donor B, and
c) 0 to 5 parts by weight relative to the total weight of the composition P, of at least one thermal stabilizer C.

7. The composition R as claimed in claim 1, wherein the thermal stabilizer C is selected from the group consisting of: an amine, a compound of which the chemical structure comprises a sterically hindered group and a nitroxyl function, a compound of which the chemical structure comprises a sterically hindered group and a phenol function, an organophosphorus compound, and combinations thereof.

8. The composition R as claimed in claim 1, wherein the iodonium salt A has the formula (IV) below:

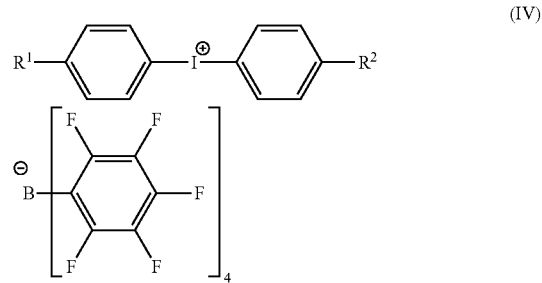   (IV)

wherein:
the symbols R¹ and R² are identical or different, and each represent a linear or branched alkyl radical having from 10 to 30 carbon atoms.

9. The composition R as claimed in claim 1, wherein the symbols R¹ and R² are identical or different, and each represent an alkyl radical selected from the group consisting of the following radicals:

   (V)

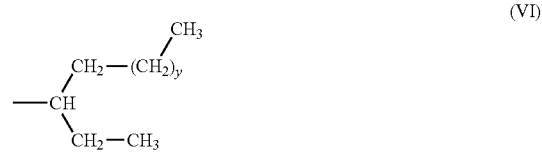   (VI)

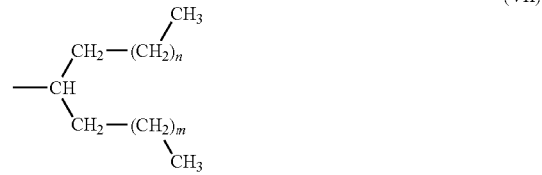   (VII)

wherein:
x is an integer ranging from 6 to 16,
y is an integer ranging from 5 to 15, and
n and m are integers which are identical or different and the sum n+m of which is between 5 and 15 (limits included).

10. The composition R as claimed in claim 1, wherein the cationically polymerizable and/or crosslinkable organic compound D is a monomer, oligomer and/or polymer which is organic in nature and bears organofunctional groups belonging to at least one of the following species:

α1.1 cycloaliphatic epoxides, taken by themselves or as a mixture with one another,
α1.2 non-cycloaliphatic epoxides, taken by themselves or as a mixture with one another,
α2 linear or cyclic alkenyl ethers, taken by themselves or as a mixture with one another,
α3 polyols: taken by themselves or as a mixture with one another, or
α4 bis-oxetanes.

11. The composition R as claimed in claim 1, wherein the cationically polymerizable and/or crosslinkable organic compound D is the compound 3,4-epoxycyclohexylmethyl-3,4-epoxycyclohexylcarboxylate having the following structure:

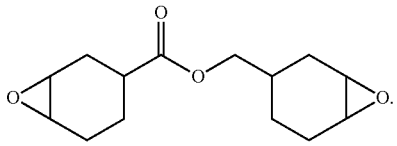 [SMILES: O=C(OCC1CCC2OC2C1)C1CCC2OC2C1]

12. A process for producing a hard film or coating, the process comprising the following steps:
   a). preparing a cationically polymerizable and/or crosslinkable composition R as defined in claim 1;
   b). applying the mixture obtained to a support; and
   c). hardening the composition by polymerization and/or crosslinking into a film or coating thermally or actinically.

13. A film or coating obtained from the crosslinking of the composition R as defined in claim 1, thermally or actinically.

14. An article, at least one surface of which is coated with a film or a coating obtained according by polymerizing and/or crosslinking the composition R as defined in claim 1.

15. A printing ink prepared from the composition R as described in claim 1.

16. The composition R as claimed in claim 1, wherein $R^1$ and $R^2$ have from 10 to 20 carbon atoms.

17. The composition R as claimed in claim 1, wherein $R^1$ and $R^2$ have from 10 to 15 carbon atoms.

18. The composition R as claimed in claim 1, wherein c and c' are equal to 1.

19. The composition R as claimed in claim 1, wherein when $R^3$ is a phenyl radical substituted with at least 2 halogens, the at least 2 halogens are at least 2 fluorine atoms.

20. The composition R as claimed in claim 1, wherein when $R^3$ is an aryl radical containing at least 2 aromatic nuclei, the at least 2 aromatic nuclei are selected from the group consisting of biphenyl and naphthyl.

21. The composition R as claimed in claim 1, wherein when $R^3$ is an aryl radical substituted with at least 1 halogen, the at least 1 halogen is a fluorine atom.

22. The composition R as claimed in claim 2, wherein $R^1$ and $R^2$ have from 10 to 20 carbon atoms.

23. The composition R as claimed in claim 2, wherein $R^1$ and $R^2$ have from 10 to 15 carbon atoms.

24. The composition R as claimed in claim 2, wherein when $R^3$ is a phenyl radical substituted with at least 2 halogens, the at least 2 halogens are at least 2 fluorine atoms.

25. The composition R as claimed in claim 2, wherein when $R^3$ is an aryl radical containing at least 2 aromatic nuclei, the at least 2 aromatic nuclei are selected from the group consisting of biphenyl and naphthyl.

26. The composition R as claimed in claim 2, wherein when $R^3$ is an aryl radical substituted with at least 1 halogen, the at least one halogen is a fluorine atom.

27. The composition R as claimed in claim 3, wherein the anion of the iodonium salt A is $[B(C_6F_5)_4]^-$ or $[B(C_6H_3(CF_3)_2)_4]^-$.

28. The composition R as claimed in claim 6, wherein composition P comprises 20 to 80 parts by weight relative to the total weight of the composition P, of the iodonium salt(s) A.

29. The composition R as claimed in claim 6, wherein composition P comprises 20 to 80 parts by weight relative to the total weight of the composition P, of the at least one hydrogen donor B.

30. The composition R as claimed in claim 8, wherein $R^1$ and $R^2$ have from 10 to 20 carbon atoms.

31. The composition R as claimed in claim 8, wherein $R^1$ and $R^2$ have from 10 to 15 carbon atoms.

32. The composition R as claimed in claim 9, wherein x is an integer ranging from 6 to 11.

33. The composition R as claimed in claim 9, wherein y is an integer ranging from 5 to 11.

* * * * *

UNITED STATES PATENT AND TRADEMARK OFFICE
CERTIFICATE OF CORRECTION

PATENT NO. : 9,353,257 B2  
APPLICATION NO. : 14/433310  
DATED : May 31, 2016  
INVENTOR(S) : Jean-Marc Frances et al.

Page 1 of 1

It is certified that error appears in the above-identified patent and that said Letters Patent is hereby corrected as shown below:

On the Title page, insert item (30), the Foreign Application Priority Data:

It should read:

--Foreign Application Priority Data

(30)    Oct. 2, 2012        (FR)            12/02616--

Signed and Sealed this
Sixteenth Day of August, 2016

Michelle K. Lee
*Director of the United States Patent and Trademark Office*